(12) United States Patent
Oberheide et al.

(10) Patent No.: US 9,467,463 B2
(45) Date of Patent: Oct. 11, 2016

(54) SYSTEM AND METHOD FOR ASSESSING VULNERABILITY OF A MOBILE DEVICE

(75) Inventors: Jon Oberheide, Ann Arbor, MI (US); Dug Song, Ann Arbor, MI (US); Adam Goodman, Bloomfield Hills, MI (US)

(73) Assignee: Duo Security, Inc., Ann Arbor, MI (US)

(*) Notice: Subject to any disclaimer, the term of this patent is extended or adjusted under 35 U.S.C. 154(b) by 962 days.

(21) Appl. No.: 13/601,409

(22) Filed: Aug. 31, 2012

(65) Prior Publication Data

US 2015/0304351 A1    Oct. 22, 2015

Related U.S. Application Data

(60) Provisional application No. 61/530,560, filed on Sep. 2, 2011.

(51) Int. Cl.
H04L 29/06 (2006.01)
H04W 12/12 (2009.01)

(52) U.S. Cl.
CPC .......... H04L 63/1433 (2013.01); H04W 12/12 (2013.01)

(58) Field of Classification Search
None
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 7,096,354 B2 | 8/2006 | Wheeler et al. |
| 7,331,518 B2 | 2/2008 | Rable |
| 7,447,784 B2 | 11/2008 | Eun |
| 7,463,637 B2 | 12/2008 | Bou-Diab et al. |
| 7,526,792 B2 | 4/2009 | Ross |
| 7,562,382 B2 | 7/2009 | Hinton et al. |
| 7,574,733 B2 | 8/2009 | Woodhill |
| 7,953,979 B2 | 5/2011 | Borneman et al. |
| 7,982,595 B2 | 7/2011 | Hanna et al. |
| 8,136,148 B1 | 3/2012 | Chayanam et al. |
| 8,161,527 B2 | 4/2012 | Curren |
| 8,200,980 B1 | 6/2012 | Robinson et al. |
| 8,245,044 B2 | 8/2012 | Kang |
| 8,332,627 B1 | 12/2012 | Matthews et al. |
| 8,335,933 B2 | 12/2012 | Humphrey et al. |
| 8,397,301 B2 * | 3/2013 | Hering et al. .................. 726/25 |
| 8,402,526 B2 | 3/2013 | Ahn |

(Continued)

OTHER PUBLICATIONS

Simske et al., "APEX: Automated Policy Enforcement eXchange", Sep. 21-24, 2010, ACM, pp. 139-142.

(Continued)

Primary Examiner — Christopher Revak
(74) Attorney, Agent, or Firm — Jeffrey Schox; Padowithz Alce

(57) ABSTRACT

A system and method for assessing vulnerability of a mobile device including at a remote analysis cloud service, receiving at least one vulnerability assessment request that includes an object identifier for an operative object of a mobile computing device, wherein the vulnerability assessment request originates from the mobile computing device; identifying a vulnerability assessment associated with the identifier of the operative object; and communicating the identified vulnerability assessment to the mobile computing device.

16 Claims, 6 Drawing Sheets

(56) References Cited

U.S. PATENT DOCUMENTS

| | | | |
|---|---|---|---|
| 8,458,798 B2 * | 6/2013 | Williams et al. | ............... 726/25 |
| 8,495,720 B2 | 7/2013 | Counterman | |
| 8,499,339 B2 | 7/2013 | Chao et al. | |
| 8,538,028 B2 | 9/2013 | Yeap et al. | |
| 8,627,438 B1 | 1/2014 | Bhimanaik | |
| 8,646,086 B2 * | 2/2014 | Chakra et al. | ................. 726/25 |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,763,077 B2 | 6/2014 | Oberheide et al. | |
| 8,850,516 B1 | 9/2014 | Hrebicek et al. | |
| 8,893,230 B2 | 11/2014 | Oberheide et al. | |
| 8,898,762 B2 | 11/2014 | Kang | |
| 2002/0123967 A1 | 9/2002 | Wang | |
| 2003/0115452 A1 | 6/2003 | Sandhu et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2005/0218215 A1 | 10/2005 | Lauden | |
| 2005/0221268 A1 | 10/2005 | Chaar et al. | |
| 2005/0268107 A1 | 12/2005 | Harris et al. | |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0242692 A1 | 10/2006 | Thione et al. | |
| 2007/0199060 A1 | 8/2007 | Touboul | |
| 2007/0228148 A1 | 10/2007 | Rable | |
| 2007/0250914 A1 | 10/2007 | Fazal | |
| 2007/0284429 A1 | 12/2007 | Beeman | |
| 2008/0049642 A1 | 2/2008 | Gudipudi et al. | |
| 2008/0120411 A1 | 5/2008 | Eberle | |
| 2009/0055906 A1 | 2/2009 | Wendorff | |
| 2009/0187986 A1 | 7/2009 | Ozeki | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0257610 A1 * | 10/2010 | Hohl | ...................... G06F 21/51 726/25 |
| 2010/0330969 A1 | 12/2010 | Kim et al. | |
| 2011/0086616 A1 | 4/2011 | Brand et al. | |
| 2011/0107389 A1 | 5/2011 | Chakarapani | |
| 2011/0138469 A1 | 6/2011 | Ye et al. | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 | 12/2011 | Nair et al. | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0216239 A1 | 8/2012 | Yadav et al. | |
| 2012/0300931 A1 | 11/2012 | Ollikainen et al. | |
| 2013/0042002 A1 | 2/2013 | Cheeniyil et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0245278 A1 | 8/2014 | Zellen | |
| 2014/0351954 A1 | 11/2014 | Brownell et al. | |
| 2015/0012914 A1 | 1/2015 | Klein et al. | |

OTHER PUBLICATIONS

Symantec, Administration Guide for Symantec TM Endpoint Protection and Symantec Network Access Control, Aug. 1, 2007.

* cited by examiner

SYSTEM AND METHOD FOR ASSESSING VULNERABILITY OF A MOBILE DEVICE

CROSS-REFERENCE TO RELATED APPLICATIONS

This application claims the benefit of U.S. Provisional Application No. 61/530,560, filed 2 Sep. 2011, and titled SYSTEM AND METHOD OF CLOUD-ASSISTED VULNERABILITY ASSESSMENT OF MOBILE DEVICES, which is incorporated in its entirety by this reference.

STATEMENT OF FEDERALLY SPONSORED RESEARCH AND DEVELOPMENT

This invention was made with government support under DARPA-RA-11-52 Cyber Fast Track awarded by the Defense Advanced Research Projects Agency. The government has certain rights in the invention.

TECHNICAL FIELD

This invention relates generally to the mobile security field, and more specifically to a new and useful system and method for assessing vulnerability of a mobile device in the mobile security field.

BACKGROUND

As mobile devices become increasingly ubiquitous, users are beginning to store sensitive information, perform financial transactions, and take other actions that are normally done on non-mobile computing platforms. This type of activity makes mobile devices an attractive target to malicious parties who may wish to compromise the security of a user's mobile device to steal data, snoop on a user's communication, or perform some other type of fraudulent actions. Therefore, the security of the mobile device (including both its hardware and software platform) is becoming increasingly important. Traditional approaches to mobile device software security often involve adopting the antivirus from non-mobile computing platforms, where installed applications and files are scanned locally on the device using signatures and heuristics to determine whether malicious applications or files may be present. However, the environment of mobile devices is where devices are less powerful have limited battery lives. Additionally, user behavior on mobile devices is different where users frequently install new applications. The number of malicious apps is unlimited, and thus, attempting to detect and prevent malicious code is unreasonable for the mobile hardware/software environment. Thus, there is a need in the mobile security field to create a new and useful system and method for assessing vulnerability of a mobile device. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The system and method for assessing vulnerability of a mobile device of the preferred embodiments employ an analysis cloud service to provide vulnerability assessment to mobile devices. The system and method primarily function to identify software components or files on a mobile computing device that contain vulnerabilities that may be leveraged by malicious parties to attack the mobile device or software of the mobile device. While the approaches of some mobile security solutions simply attempt to identify malicious software on the mobile device, the system of the preferred embodiment can securely and in a scalable manner identify components that may be leveraged by malicious entities. A vulnerability assessment can preferably identify vulnerabilities in legitimate software that may be exploited by malicious applications or attackers, as opposed to just identifying existing malicious applications installed on the mobile device as traditional mobile security software does. On many mobile devices, there are often app ecosystems that promote the installation of numerous applications. The system and method preferably uses the distributed vulnerability assessments to target a bounded number of security issues as opposed to combating a constantly evolving and growing number of malicious code. Additionally, the analysis cloud service can facilitate the heavyweight processing that some vulnerability assessment techniques may require, which can alleviate mobile devices from these processing tasks. Vulnerability assessment also facilitates identifying security fixes in the mobile computing landscape which has numerous stake holders including maintainers of mobile OS's, device firmware developers, carriers configuring device and various developers for libraries and applications. The system and method of a preferred embodiment is preferably employed for mobile devices. Here mobile devices may include mobile phones, tablet computers, gaming devices, TV-computer devices, GPS devices, or any suitable computing device.

A System for Assessing Vulnerability of a Mobile Device

Figure 1:
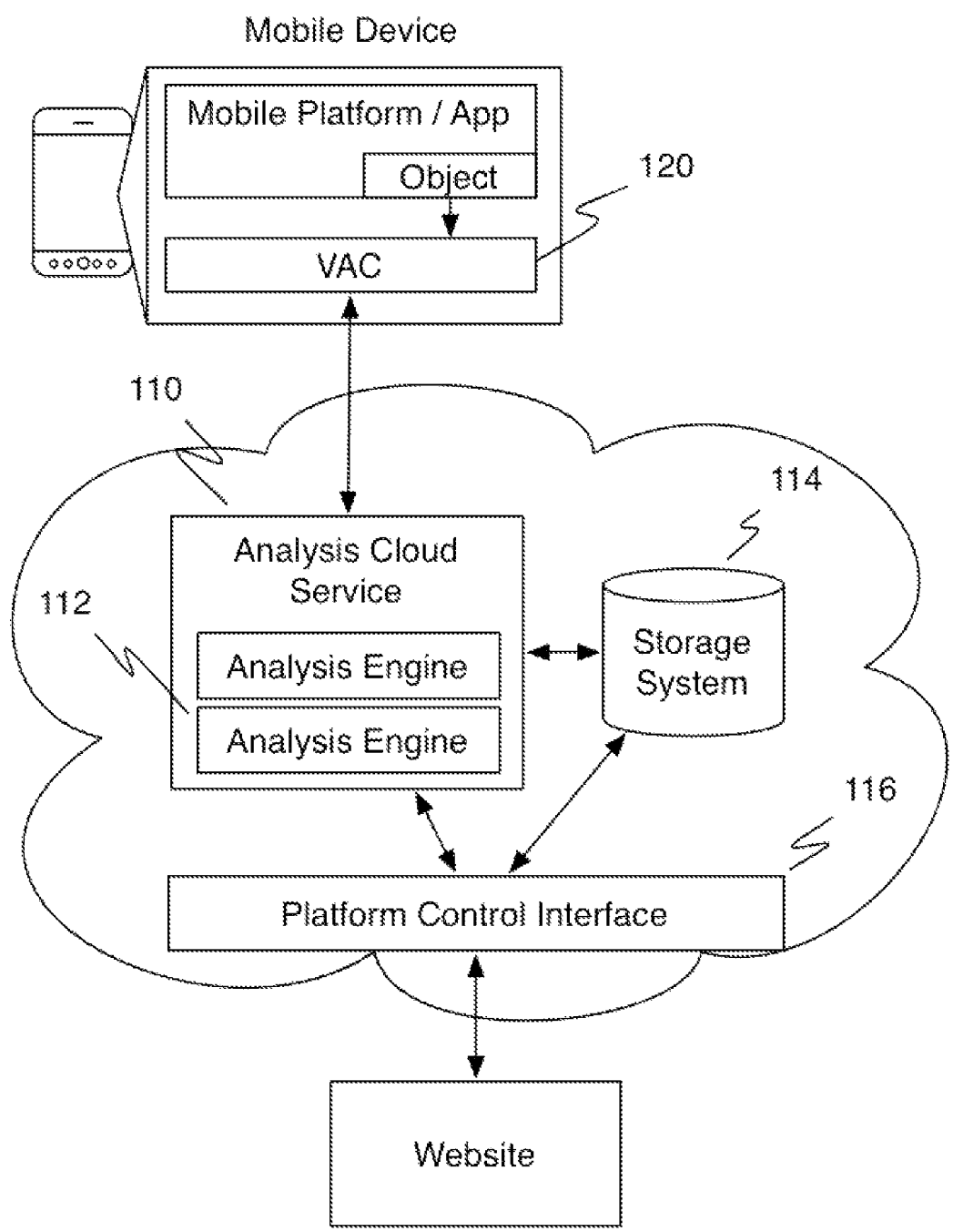
FIG. 1 is a schematic representation of a system of a first preferred embodiment of the invention.
Figure 2:
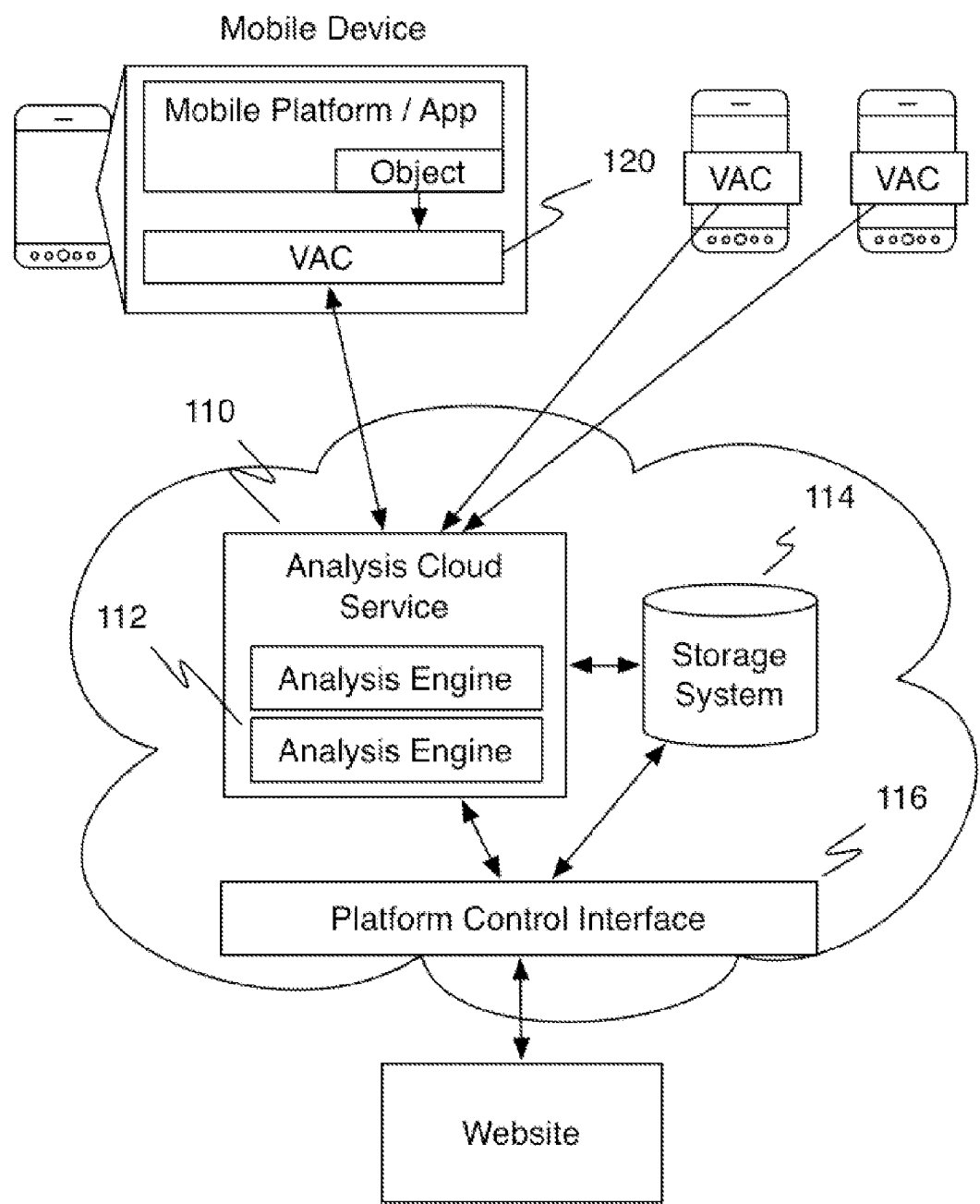
FIG. 2 is a schematic representation depicting a multi-tenant application of a system of a first preferred embodiment of the invention.

As shown in FIG. 1, a system for assessing vulnerability of a mobile device of a preferred embodiment includes an analysis cloud service 110 and a Vulnerability Assessment Component (VAC) of a mobile computing device 120. The analysis cloud service may additionally include cloud-based storage system 1114 and a platform control interface 1116. As described above the system of the preferred embodiment functions to identify software components or files on a mobile computing device that contain vulnerabilities that may be leveraged by malicious parties to attack the mobile device or software of the mobile device. The system is preferably configured such that the analysis cloud service may provide vulnerability assessment to a large number of mobile computing devices as shown in FIG. 2. As exemplary applications, this system may be deployed for use on carrier devices or within a collection of devices managed by a corporate IT department. The use of an analysis cloud service to facilitate vulnerability assessment additionally preferably enables the system to be used by a wide variety of devices. Updates can preferably be easily and quickly made to the analysis cloud service, and mobile devices utilizing a VAC can instantly benefit from up-to-date vulnerability information.

The analysis cloud service 110 of the preferred embodiment functions to remotely analyze and assess the vulnerability of a plurality of mobile devices that utilize the service. The analysis cloud service 110 is preferably a network-based service. The analysis cloud service 110 is preferably a software component running on a server that is accessible to the mobile device via the network. Such a network may be public or private in nature, and the analysis cloud service 110 may communicate with the VAC using any variety of protocols using any type of network interface deemed appropriate. The analysis cloud service 110 is preferably configured to scale within a cloud computing environment to meet large volumes of vulnerability requests. The analysis cloud service 110 is tasked with receiving vulnerability assessment requests from a VAC, using the information in the request to identify vulnerabilities using one of its analysis engines 112, and returning the result back to the VAC over the network or through any suitable means. The analysis cloud service may additionally include a vulnerability storage system 114 to facilitate the detection and analysis of vulnerability in a plurality of devices. In another alternative embodiment, the analysis cloud service may be communicatively coupled with a platform control interface 116 that can provide vulnerability assessment response control or informational statistics.

The analysis engine 112 of the analysis cloud service 110 of a preferred embodiment functions to process and assess whether a vulnerability is present in an operable object on a mobile device. The analysis engine 112 may implement any number of algorithms or heuristics to perform a vulnerability assessment. For known vulnerabilities, the analysis engine 112 may have certain patterns it can identity in an operable object to determine whether the vulnerability is present. As most vulnerabilities present themselves in software code, the analysis engine may disassemble an operable object and analyze underlying machine code to determine whether a vulnerability is present or not. For unknown vulnerabilities, the analysis engine 112 may employ heuristics to identify more general weaknesses that may be representative of a class of vulnerabilities, rather than attempting to identify a specific vulnerability. Any number of analysis engines 112 or routines may be present in the analysis cloud service 110. As an example, the analysis engine 112 may include algorithms and heuristics to identify privilege escalation vulnerabilities such as bugs allowing a device to be rooted (e.g., ASHMEM vulnerability), neglecting to check if messages are from a trusted source (e.g., Exploid or Gingerbreak vulnerability), privilege levitating (e.g., Levitator vulnerability), writing to arbitrary memory address space (e.g., Mempodroid vulnerability), overwhelming a system with command arguments (e.g., Android ZergRush vulnerability), neglecting to check return values enabling root shells (e.g., Zimperlich vulnerability), and/or any suitable vulnerability or exploits.

The vulnerability storage system 114 of a preferred embodiment functions to store vulnerability assessment results and any related metadata. The vulnerability storage system 114 is preferably communicatively coupled to the analysis cloud service 110. Data of the vulnerability storage system 114 may additionally be indexed by cryptographic hashes or signatures of operable objects or identifiers. This functions to enable vulnerability assessments to be cached and quickly delivered to a mobile device while avoiding reprocessing similar or duplicate operable objects. This has unique benefits for a multitenant analysis cloud service 110, and can result in considerable processing savings. The vulnerability storage system 114 may additionally store data that may be used by the platform control interface 116 to provide statistical data for one or more mobile devices.

The platform control interface 116 of a preferred embodiment functions to provide a control interface for global management over at least a subset of the mobile devices using the analysis cloud service 110. The platform control interface 116 in one variation provides statistical and infographic reports based on the vulnerability assessment of a plurality of devices. For example, a company could see the vulnerability assessment for all devices used by employees. An IT department of the company would then be empowered to make decisions about how to update their mobile IT infrastructure to ensure the mobile security of their employees. Additionally or alternatively, the platform control interface 116 may be used to control devices. The platform control interface 116 may additionally or alternatively provide functionality for a user to initiate pushing patches or any suitable device updates to a mobile device or devices.

The vulnerability assessment component (VAC) 120 of a preferred embodiment functions to facilitate communicating required information from a mobile device to the analysis cloud service 110. The VAC 120 is preferably a software agent installed on a mobile device that collects software objects to be assessed and transmits vulnerability assessment requests to the analysis cloud service 110. The VAC 120 additionally can receive the vulnerability assessments and depending on the application present the vulnerability assessment result to a user, provide the assessment to an application, automatically initiate patching a vulnerability, or take any suitable action. As many vulnerability assessment techniques may be computationally heavyweight, the VAC 120 preferably off-loads these tasks to the analysis cloud service 110. The VAC 120 may be built into the mobile software platform itself, installed as a third-party app by the user of the mobile device, or delivered via any other mechanism available to execute software on the mobile device.

The VAC 120 preferably compiles information about operable objects on the mobile device. An operable object is preferably an entity upon which the vulnerability assessment is being performed. The operable object is a software entity, which can include a system component, a mobile application, a data file, or any other logical or physical collection of data. Vulnerabilities are typically present in software code, so in most cases the operable object would be some executable code used by the mobile software platform that is suspected to have a known or unknown vulnerability present. The information on the operable object is preferably compiled into an object identifier. The object identifier is preferably a direct identifier such as copy of the code or segment of code from the operable object, but the object identifier may be file or executable name, a version number or ID, a configuration file, a hash or signature generated from the operable object, any alternative references to the data object, or any suitable data that may be used to identify the operable object.

A Method for Assess Vulnerability of a Mobile Device

Figure 3:
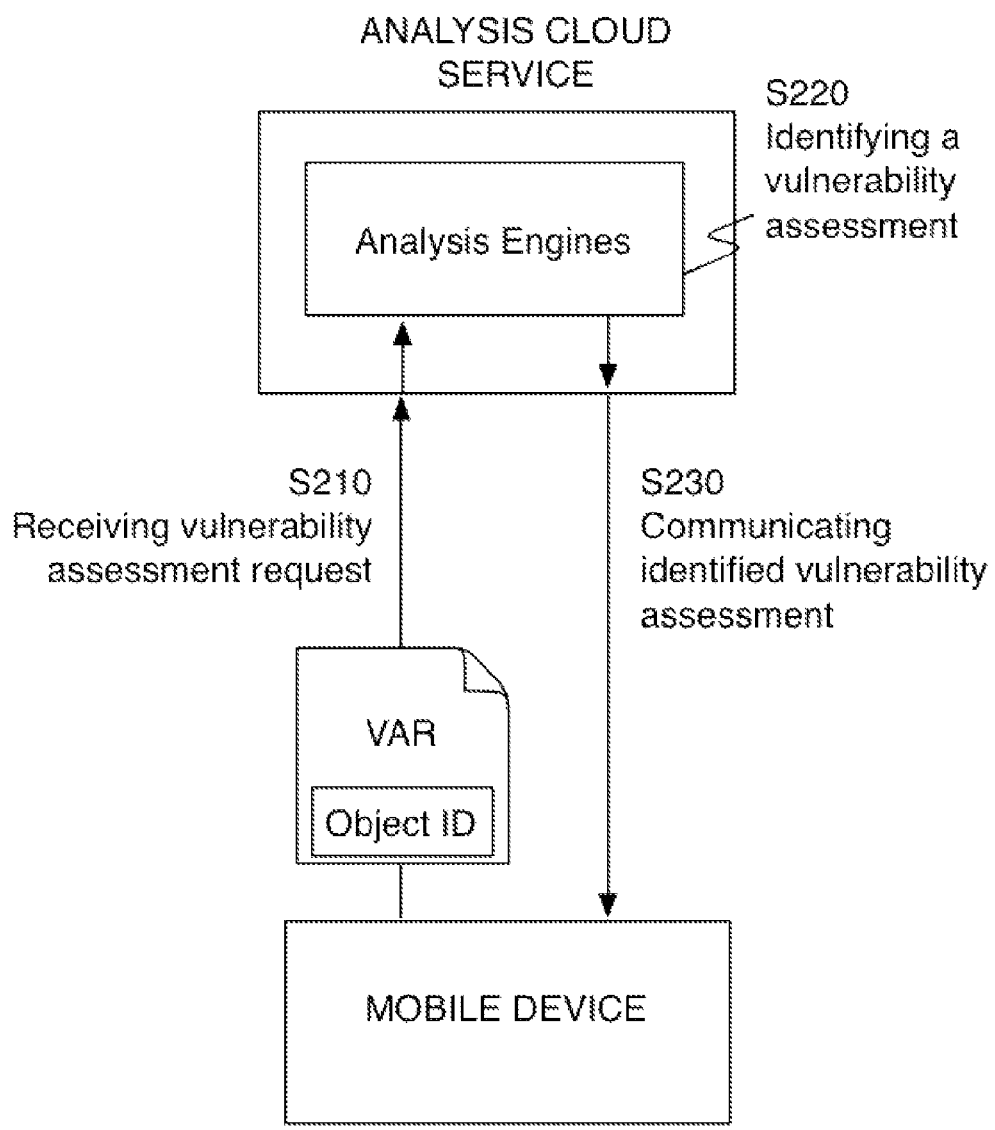
FIGS. 3-4 are schematic representations of methods of preferred embodiments of the invention.

As shown in FIG. 3, method for assessing vulnerability of a mobile device of preferred embodiment includes at a remote analysis cloud service, receiving at least one vulnerability assessment request that includes an object identifier for an operative object of a mobile computing device block S210; identifying a vulnerability assessment associated with the identifier of the operative object block S220; and communicating the identified vulnerability assessment to the mobile computing device block S230. As described above, the method of a preferred embodiment functions to identify software components or files on a mobile computing device that may contain vulnerabilities that can be leveraged by malicious parties to attack the mobile device or software of the mobile device. Preferably, the method is additionally adapted for implementing vulnerability assessment for a plurality of mobile devices. In this alternative embodiment, a plurality of vulnerability assessment requests are received at the analysis cloud service, and correspondingly, vulnerability assessments may be identified and communicated to the associated mobile devices. This multitenant alternative preferably includes storing identified vulnerability assessments in a cloud based storage system as described below.

Block S210, which includes at a remote analysis cloud service, receiving at least one vulnerability assessment request that includes an object identifier for an operative object of a mobile computing device, functions to obtain the data needed to perform a vulnerability assessment on behalf of a mobile device. The vulnerability assessment request originates from a mobile computing device and received over a network. The network communication may use any suitable network interface protocol. Vulnerability requests may be received from a plurality of devices. A vulnerability assessment request preferably includes at least one object identifier for an operative software object of a mobile computing device. The object identifier is preferably a copy or segment of code from the software of the operable object. The object identifier may alternatively be an application identifier or version number, data name, a version number or ID, a configuration file, the code or segment of code from the operable object, a hash or signature generated from the operable object, or any suitable data that may be used to identify the operable object.

Block S220, which includes identifying a vulnerability assessment associated with the identifier of the operative object, functions to determine if a potential vulnerability or weakness is present in an operable object of a mobile device. An analysis engine or any suitable component of the analysis cloud service preferably performs the processing on the object identifier. Preferably, identifying a vulnerability includes disassembling the executable code into native machine code and detecting unpatched vulnerabilities. For example, a file such as the volume manager file may be disassembled into its native machine code and analyzed to determine whether a known vulnerability, such as the gingerbreak vulnerability for Android devices, has been patched. Code analysis routines can preferably be developed and deployed to the analysis cloud service at any suitable time, which enables the analysis cloud service to provide current vulnerability assessment to all devices at the time of their vulnerability assessment. Alternatively or additionally, identifying a vulnerability may include querying a map of object identifiers to vulnerability assessments. For example, the version number of software may have been included as the object identifier, and that object identifier may be used to look up a known vulnerability assessment. More preferably, a cryptographic hash of a code segment may be used to query a storage system for an assessment previously calculated for the code segment. The analysis cloud service preferably includes a combination of approaches to identify a vulnerability.

Block S230, which includes communicating the identified vulnerability assessment to the mobile computing device, functions to return the analysis result and any other relevant metadata from the cloud service back to the mobile device over the network. If a vulnerability is identified, a parameter is preferably set in the response to the mobile device to indicate the vulnerability. Additional vulnerability information or data may additionally or alternatively be compiled, such as the appropriate patch or executable code to run on the machine to fix the executable, a link to an online resource to find an appropriate patch, contact information for the entity responsible for patching the vulnerability, or any suitable information about the vulnerability. In some variations, the analysis cloud service may send a response to the vulnerability assessment request that requests a second object identifier from the VAC. For example, in an initial request, the VAC may transmit an object identifier only including the version number. If this version number is determined by the analysis cloud service to be insufficient to determine the vulnerability status of the device, the VAC may be asked to transmit a code segment as the object identifier.

Figure 4:
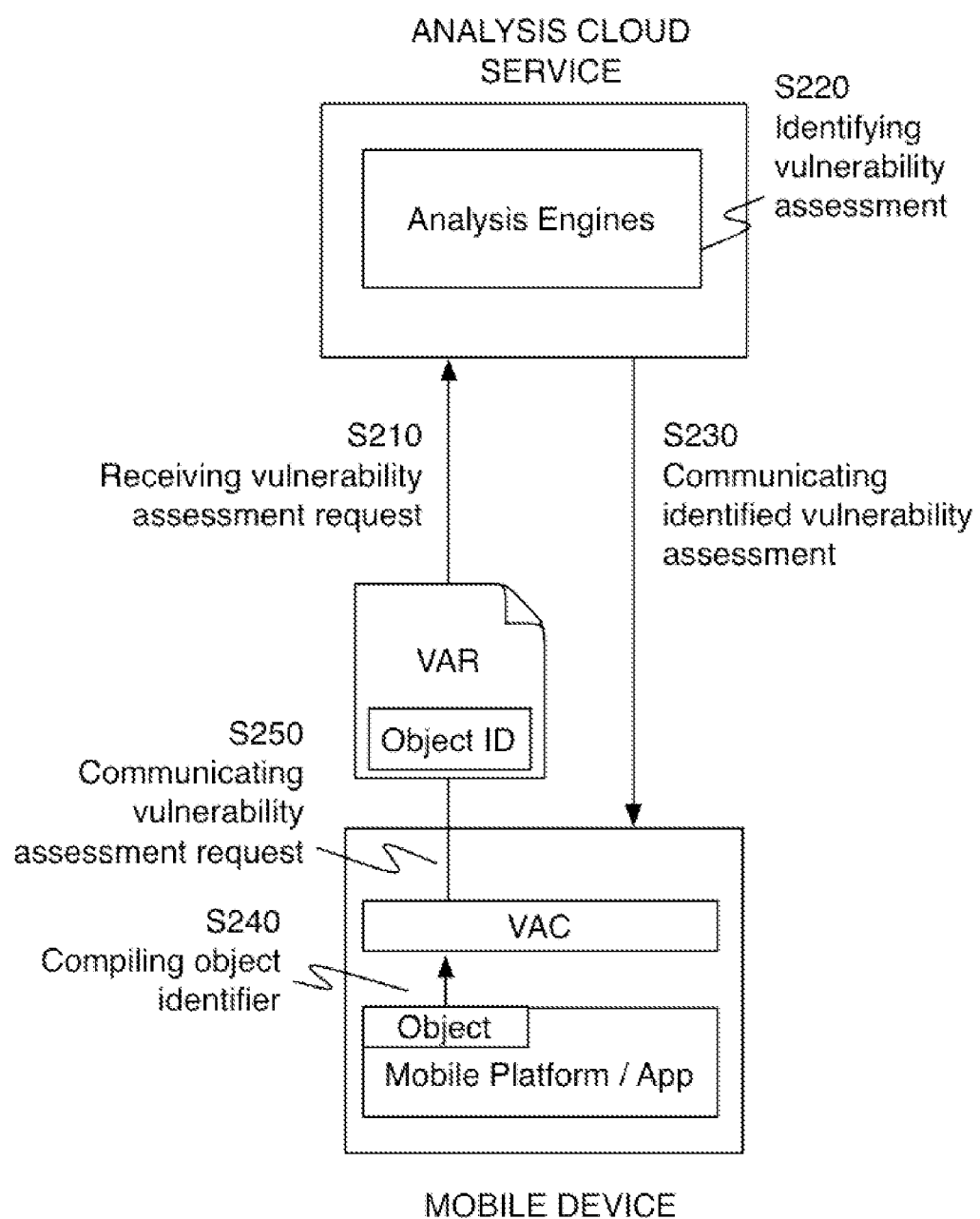

Additionally, the method of the preferred embodiment may include at a vulnerability assessment component (VAC) operable on the mobile device, compiling at least one object identifier for the vulnerability assessment request block S240; and communicating the vulnerability assessment request to the analysis cloud service block S250 as shown in FIG. 4. Blocks S240 and S250 function to collect information needed to assess vulnerability of a mobile device and transmit the information from the mobile device to the analysis cloud service. The VAC is preferably substantially similar to the VAC described above. The VAC may be an application, a component integrated and used by an application, a component used by an OS, or any suitable object operable on the mobile device. The vulnerability assessment request transmitted from the VAC preferably corresponds to the vulnerability assessment request received at the analysis cloud service. Thus, blocks S240 and S250 are preferably performed prior to the analysis cloud service receiving the vulnerability assessment request.

A vulnerability assessment process is preferably initiated on the mobile device by a user, but a vulnerability assessment process may be scheduled, automatically initiated, initiated through an API, initiated by the analysis cloud service, or initiated in any suitable manner. In one variation, the VAC may trigger a vulnerability assessment request without requiring the user to request it. For example, the analysis cloud service or a third-party service may communicate with the VAC on the mobile device to initiate a vulnerability assessment without any user interaction on the mobile device.

The VAC may seek out and collect an operable object from the software that makes up the mobile platform and applications and prepare the object for transmission to the analysis cloud system. For example, an executable file that implements a system service of the mobile platform that is suspected to be vulnerable to a known exploit can be collected by the VAC. The aforementioned file may be transmitted in the request to the analysis cloud service along with other identifying details or metadata about the device, file, or request. As described, the object identifier may include a portion of executable code. In a variation of the embodiment described above, the VAC may send an alternate or compact form of the operable object to be analyzed by the CS. For example, this alternate form could be a summary, cryptographic hash, version number, or other identifier that results in a more efficient transmission of the object identifier to the analysis cloud service instead of transmitting the full operable object. The analysis cloud service may use this compact representation to avoid unnecessary or duplicate analysis. For example, a cryptographic hash of an operable object may be sent to the analysis cloud service by the VAC; the VAC can check whether that operable object has already been analyzed by looking up the hash in a vulnerability storage system; if the object has been analyzed, the result can be immediately returned; if not, the analysis cloud service can request that the VAC send the full Object and perform its usual analysis routines on the Object. In one variation, a plurality of object identifiers are included in a vulnerability assessment request. The plurality of object identifiers may include executable code segments, device identifiers, and software version identifiers, and/or any suitable identifiers.

A vulnerability assessment request may be for a single vulnerability check but may alternatively be for multiple vulnerability checks. For example, communicating the vulnerability assessment request may include multiplexing a plurality of vulnerability assessment requests into a single communication to the remote analysis cloud service; and wherein receiving at least one vulnerability assessment request at the analysis cloud service includes demultiplexing a vulnerability assessment request into a plurality of vulnerability assessment requests. This batched transmission functions for more efficient use of the mobile device's network radio. While at least one of the assessment request includes an object identifier for which a vulnerability assessment is required, extraneous, faked, or otherwise superfluous vulnerability assessment requests may be made. The superfluous requests function to misdirect any attempts to reverse engineer the vulnerability assessment process by a malicious party.

Figure 5:
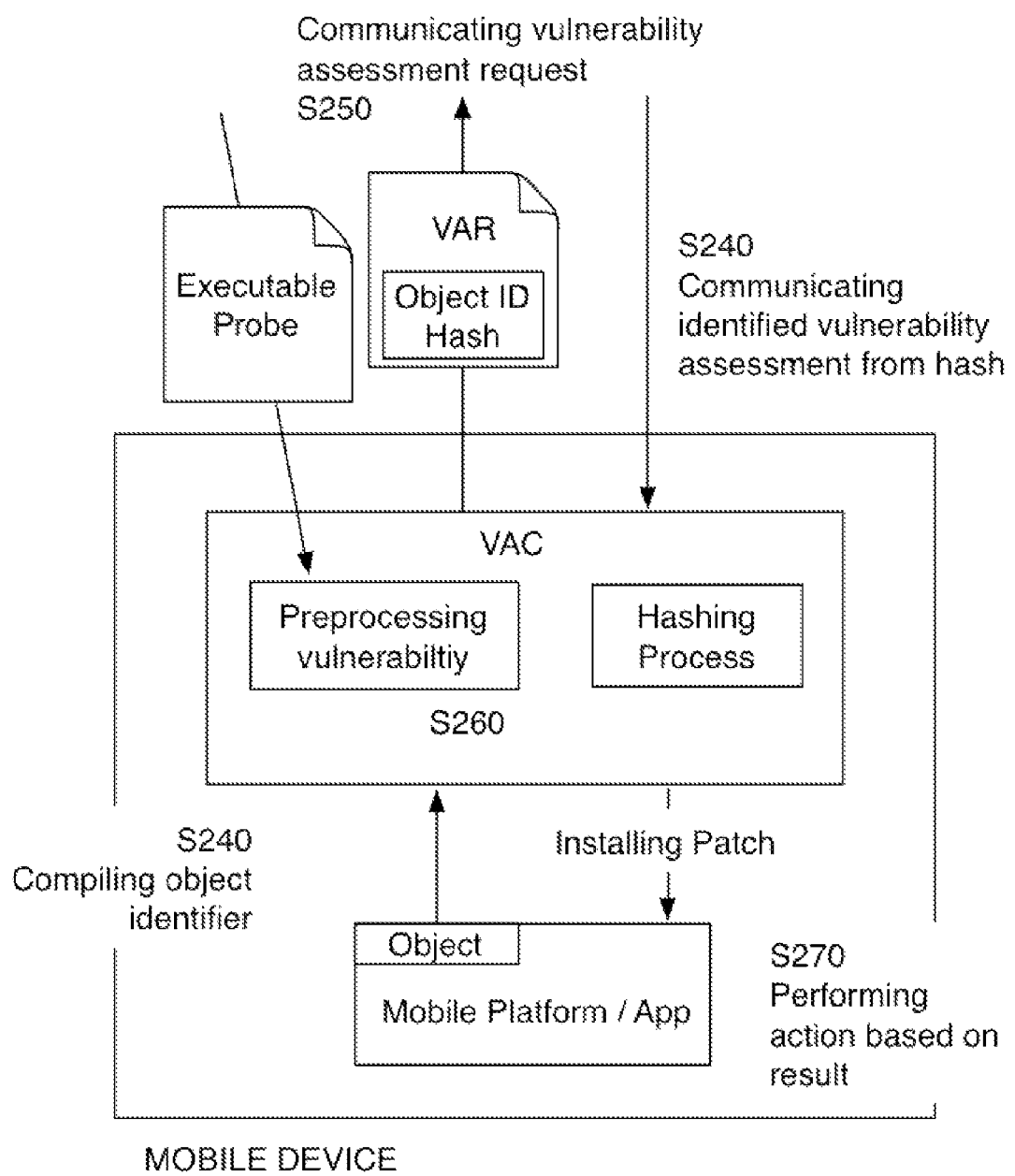
FIG. 5 is a detailed schematic representation of alternative variations of a Vulnerability Assessment Component of a preferred embodiment of the invention.

Alternatively or additionally, a method of a preferred embodiment may include at the VAC, performing at least a partial vulnerability assessment prior to communicating the vulnerability assessment request to the cloud service S260 as shown in FIG. 5. Certain analysis routines may be performed on the mobile device by the VAC instead of being performed on the analysis cloud service. These analysis routines may be bundled with the VAC initially, updated periodically from the analysis cloud service, or pushed down from the analysis cloud service to the VAC at the time a vulnerability assessment is requested or triggered. Preferably, the VAC will initially contact the analysis cloud service, and the analysis cloud service will return an executable probe to the VAC. The executable probe is preferably a script, application, and/or file facilitating an at least partial vulnerability assessment performed on the mobile device. The executable probe may identify the presence of a vulnerability or alternatively collect information indicative of a vulnerability that may be subsequently used by the analysis cloud service. The result of the test of the executable probe is preferably communicated to the analysis cloud service as an object identifier of a vulnerability assessment request. Similarly, a cache of object identifiers or hashes of object identifiers may be stored locally on the device, and vulnerability assessments may initially be checked on the mobile device before sending a vulnerability request to the analysis cloud service.

Additionally, a method of a preferred embodiment may include performing some action based on the result of the analysis that was submitted block S270 as shown in FIG. 5. Such an action may include notifying the user of a potential vulnerability, giving the user additional information on the origin of the vulnerability and how it may be mitigated, notifying a third-party service about the presence of the vulnerability on the user's mobile platform, or even automatically patching the vulnerability or taking further action that may limit the risk of the vulnerability's presence. For example, a banking application may want to ensure that the mobile device is not vulnerable to particular attacks during particular transactions. The method for assessing vulnerability of a mobile device may be performed and the resulting vulnerability assessment may be appended to a transaction as a qualifier for the transaction. When automatically patching a vulnerability, a vulnerability patch is preferably included or referenced in the vulnerability assessment response from the analysis cloud service. The vulnerability patch may be automatically installed or may alternatively require user interaction to complete installation of the vulnerability patch.

Figure 6:
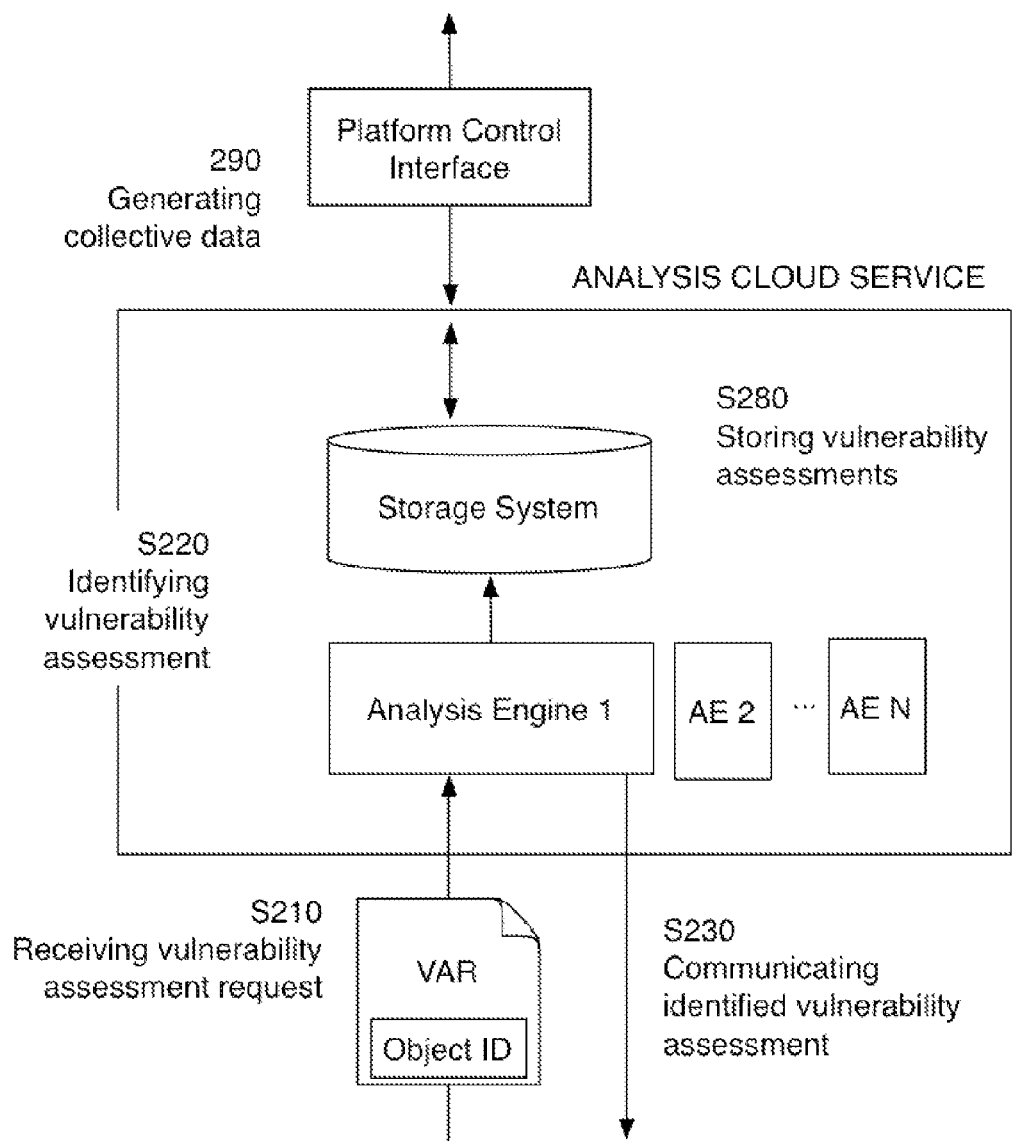
FIG. 6 is a detailed schematic representation of alternative variations of a analysis cloud service of a preferred embodiment of the invention.

Additionally, a method of a preferred embodiment may include the use of a vulnerability storage system to facilitate vulnerability identification. The vulnerability storage system is preferably a database, but may alternatively be a memory cache or any suitable storage system. Preferably, a cloud based storage system stores identified vulnerability assessments according to the associated object identifier block S280 as shown in FIG. 6. The cloud based storage system may be a component of the analysis cloud service, but may alternatively be any suitable storage component. A cryptographic hash of the vulnerability assessment or other sufficiently unique identifier may be used to lookup and store the results in the cache. The vulnerability storage system can preferably be used as a cache to avoid performing unnecessary duplicate analysis for various operable objects that have been previously submitted and analyzed. For example, a VAC may submit a code segment of an operable object from Alice's device for analysis, which the analysis cloud service will analyze and store the result in the vulnerability storage system. If a VAC on Bob's mobile device submits an identical code segment later, the CS can avoid re-running a potentially expensive analysis and simply lookup the existing result and return it immediately. In an alternative variation of the above example, a VAC of Alice's device calculates a cryptographic hash of the code segment. This hash is initially sent to the analysis cloud service. Assuming this code segment has never been analyzed, the analysis cloud service sends a response requesting the code segment. Alice's VAC then transmits the code segment as the object identifier. The analysis cloud service will analyze and store the result in the vulnerability storage system using the hash as a key. On Bob's mobile device, the VAC also generates a hash of the code segment and initially transmits the hash to the analysis cloud service. In this example, the code segments (and thus the hashes) of Alice and Bob are identical. The analysis cloud service uses the hash to find the results calculated from Alice's vulnerability assessment. These results are sent to Bob's device. Analysis of the code segment from Bob was never processed directly because the result had been collected from another device.

In a variation of the embodiment described above, the VAC can authenticate itself to the CS in order to verify the identity of the mobile devices sending requests and also uniquely identify those devices for statistical trending, inventory, or other tracking purposes. The VAC may be seeded with some unique identifiers (IMEI, IMSI, hardware IDs, etc) and keys with which to cryptographically sign requests (eg. HMAC-SHA1, RSA, etc) to the CS.

Additionally, a method of a preferred embodiment may include at a platform control interface communicatively coupled to the analysis cloud service, compiling a mapping of identified vulnerability and associated object identifiers stored in the cloud based storage system and generating collective vulnerability data for the plurality of mobile computing devices block S290 as shown in FIG. 6. The vulnerability data preferably provides insight into overall statistics of mobile devices that use the analysis cloud service. This vulnerability data may additionally be segmented according to particular devices. For example, a company with employee issued phones may be able to view data on the vulnerability of all employee-issued phones in a single interface. The platform control interface may additionally be used for device management. At the platform control interface, the method may include pushing a vulnerability fix to the at least one mobile device in response to generated collective vulnerability data, collecting vulnerability assessments from one or more mobile devices, or remotely initiating any suitable action within the vulnerability assessment system.

An alternative embodiment preferably implements the above methods in a computer-readable medium storing computer-readable instructions. The instructions are preferably executed by computer-executable components preferably integrated with an analysis cloud service and/or a Vulnerability Assessment Component. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for assessing vulnerability of a mobile device comprising:
    at a vulnerability assessment component (VAC) operable on the mobile device and prior to receiving a vulnerability assessment request at a remote analysis cloud service, compiling at least one object identifier for the vulnerability assessment request, wherein compiling the at least one object identifier includes compiling and sending at least one additional superfluous object identifier;
    communicating the vulnerability assessment request to the remote analysis cloud service;
    at the remote analysis cloud service, receiving the at least one vulnerability assessment request that includes the object identifier for an operative object of the mobile computing device, wherein the vulnerability assessment request originates from the mobile computing device;
    identifying a vulnerability assessment associated with the identifier of the operative object; and
    communicating the identified vulnerability assessment to the mobile computing device.

2. The method of claim 1, wherein the object identifier includes at least a portion of executable code, and wherein identifying a vulnerability assessment includes disassembling the executable code into native machine code and detecting unpatched vulnerabilities.

3. The method of claim 2, wherein detecting unpatched vulnerabilities includes detecting privilege escalation vulnerabilities.

4. The method of 1, wherein the at least one compiled object identifier is a plurality of object identifiers that includes an executable code segment, a device identifier, and component version identifier.

5. The method of claim 1, wherein communicating the vulnerability assessment request includes multiplexing a plurality of vulnerability assessment requests into a single communication to the remote analysis cloud service; and wherein receiving at least one vulnerability assessment request at the analysis cloud service includes demultiplexing a vulnerability assessment request into a plurality of vulnerability assessment requests.

6. The method of claim 1, further comprising at the VAC, receiving an executable probe; and performing at least a partial vulnerability assessment according to the executable probe prior to communicating the vulnerability assessment request to the cloud service.

7. The method of claim 6, wherein performing at least a partial vulnerability assessment includes checking a cache of vulnerability assessments.

8. The method of claim 1, further comprising the VAC initiating installation of a vulnerability patch to relevant vulnerabilities identified in the vulnerability assessment results.

9. The method of claim 1, wherein the VAC is a stand-alone application controlled by a user.

10. The method of claim 1, wherein the VAC is a component integrated into an application of the device; and further comprising communicating the identified vulnerability assessment from the VAC to the application of the device.

11. A method for assessing vulnerability of a mobile device comprising:
    at a vulnerability assessment component (VAC) operable on the mobile device and prior to receiving a plurality of vulnerability assessment requests at a remote analysis cloud service, compiling at least one object identifier for the plurality of vulnerability assessment requests, wherein compiling the at least one object identifier includes compiling and sending at least one additional superfluous object identifier;
    communicating the plurality of vulnerability assessment requests to the remote analysis cloud service;
    at the remote analysis cloud service, receiving the plurality of vulnerability assessment requests, wherein the vulnerability assessment request includes the at least one object identifier for an operative object of the mobile computing device, and wherein the vulnerability assessment request originates from the mobile computing device;
    for each vulnerability assessment request, identifying a vulnerability assessment associated with the identifier of the operative object; and
    communicating the identified vulnerability assessment to the associated mobile computing device.

12. The method of claim 11, further comprising in a cloud based storage system, storing identified vulnerability assessments according to the associated object identifier.

13. The method of claim 12, wherein storing identified vulnerability assessments are stored according to a hash of the associated object identifier.

14. The method of claim 13, further comprising at a vulnerability assessment component (VAC) operable on a mobile computing device and prior to receiving a vulnerability assessment request at the remote analysis cloud service, compiling a hash of at least one object identifier for the vulnerability assessment request; and communicating a first vulnerability assessment request including the hash to the analysis cloud service; and wherein identifying vulnerability assessment includes querying the cloud based storage system for an identified vulnerability assessment associated with the hash.

15. The method of claim 12, further comprising at a platform control interface, compiling a mapping of identified vulnerability and associated object identifiers stored in the cloud based storage system and generating collective vulnerability data for the plurality of mobile computing devices.

16. The method of claim 15, further comprising at the platform control interface, pushing a vulnerability fix to the at least one mobile device in response to generated collective vulnerability data.

* * * * *